United States Patent
Närdemann et al.

(10) Patent No.: US 11,047,446 B2
(45) Date of Patent: Jun. 29, 2021

(54) SHOCK ABSORBER WITH POSITION SENSOR

(71) Applicant: AB ELEKTRONIK GMBH, Werne (DE)

(72) Inventors: Dieter Närdemann, Hamm (DE); Markus Dorn, Kamen (DE); Viktor Weinbender, Dortmund (DE)

(73) Assignee: AB Elektronik GmbH, Werne (DE)

( * ) Notice: Subject to any disclaimer, the term of this patent is extended or adjusted under 35 U.S.C. 154(b) by 18 days.

(21) Appl. No.: 16/451,952

(22) Filed: Jun. 25, 2019

(65) Prior Publication Data

US 2020/0011394 A1    Jan. 9, 2020

(30) Foreign Application Priority Data

Jul. 3, 2018   (DE) .................... 10 2018 116 101.8

(51) Int. Cl.
| | |
|---|---|
| *F16F 9/38* | (2006.01) |
| *B60G 17/015* | (2006.01) |
| *F16F 9/32* | (2006.01) |
| *F16F 9/19* | (2006.01) |
| *G01B 7/14* | (2006.01) |

(52) U.S. Cl.
CPC ............. *F16F 9/3292* (2013.01); *F16F 9/19* (2013.01); *G01B 7/14* (2013.01); *F16F 2230/0047* (2013.01); *F16F 2230/08* (2013.01)

(58) Field of Classification Search
CPC .... F16F 9/19; F16F 9/38; B60G 13/08; B60G 17/019; B60G 17/015
USPC ............ 188/266.1, 267, 267.2; 280/125.157; 701/37
See application file for complete search history.

(56) References Cited

U.S. PATENT DOCUMENTS

| | | | | |
|---|---|---|---|---|
| 2,703,156 A | * | 3/1955 | Depallens | ............... F16F 7/09 188/129 |
| 4,167,991 A | * | 9/1979 | Karklins | ............... F16F 9/38 188/322.12 |

(Continued)

FOREIGN PATENT DOCUMENTS

| | | |
|---|---|---|
| DE | 35 10 252 | 9/1986 |
| DE | 10 2004 007 962 | 9/2005 |

(Continued)

OTHER PUBLICATIONS

GPTO Search Report for corresponding Patent Application No. DE 10 2018 116 101.8, dated Mar. 3, 2019—10 pages.

(Continued)

*Primary Examiner* — Christopher P Schwartz
(74) *Attorney, Agent, or Firm* — Dority & Manning, P.A.

(57) ABSTRACT

Example aspects relate to a shock absorber with a position sensor, and a method to produce it. The shock absorber comprises a first and second damper part, which are arranged movable relative to each other in a longitudinal direction L. A position sensor is arranged to detect the relative position of the first damper part to the second damper part, and comprises an index element on the first damper part as well as an electric detection circuit for detecting the position of the index element. A flexible sleeve is at least partially arranged around the first and/or the second damper part and fixed relative to the second damper part. To enable a particularly simple design, the detection circuit is attached to the flexible sleeve.

13 Claims, 6 Drawing Sheets

(56) References Cited

U.S. PATENT DOCUMENTS

| | | | | |
|---|---|---|---|---|
| 4,167,992 A | * | 9/1979 | McClellan | F16F 9/38 188/322.12 |
| 5,009,450 A | | 4/1991 | Herberg et al. | |
| 5,218,308 A | | 6/1993 | Bosebeck et al. | |
| 5,233,293 A | * | 8/1993 | Huang | G01P 3/52 324/207.15 |
| 5,251,729 A | * | 10/1993 | Nehl | B60G 17/019 188/266.1 |
| 7,219,780 B2 | * | 5/2007 | Thurmann | F16F 9/38 188/322.12 |
| 7,308,975 B2 | * | 12/2007 | Nehl | B60G 17/01933 188/267 |
| 7,441,789 B2 | * | 10/2008 | Geiger | B60G 17/0155 280/124.157 |
| 8,253,281 B2 | * | 8/2012 | Namuduri | H02K 7/1876 310/23 |
| 9,874,262 B2 | * | 1/2018 | Schimetka | F16F 9/38 |
| 10,479,160 B2 | * | 11/2019 | Roessle | B60G 13/08 |
| 2002/0100649 A1 | * | 8/2002 | Agrotis | F16F 9/3292 188/266.1 |
| 2003/0075401 A1 | | 4/2003 | Carlson | |
| 2005/0120795 A1 | | 6/2005 | Nehl et al. | |
| 2005/0179177 A1 | | 8/2005 | Thomae et al. | |
| 2007/0215420 A1 | | 9/2007 | Naidu et al. | |
| 2008/0189010 A1 | * | 8/2008 | Cubalchini | F16F 9/3292 701/37 |
| 2009/0064804 A1 | | 3/2009 | Memmel et al. | |
| 2009/0178554 A1 | | 7/2009 | Bochen et al. | |

FOREIGN PATENT DOCUMENTS

| | | |
|---|---|---|
| DE | 10 2006 016 709 | 10/2007 |
| DE | 20 2006 010 887 | 11/2007 |
| DE | 10 2008 004 983 | 7/2009 |
| DE | 10 2017 117 154 | 1/2019 |
| EP | 1 878 940 | 1/2008 |
| EP | 1 964 696 | 9/2008 |
| FR | 2675868 | 10/1992 |
| WO | WO 2003/038 379 | 5/2003 |

OTHER PUBLICATIONS

PCT International Search Report and Written Opinion for corresponding PCT Application No. PCT/EP2019/066890, dated Sep. 26, 2019, 18 pages.

\* cited by examiner

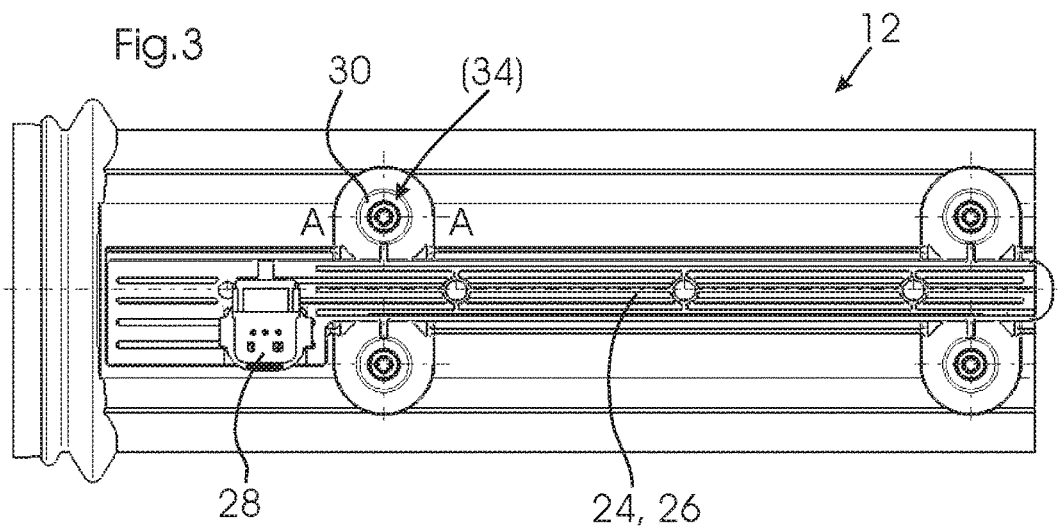
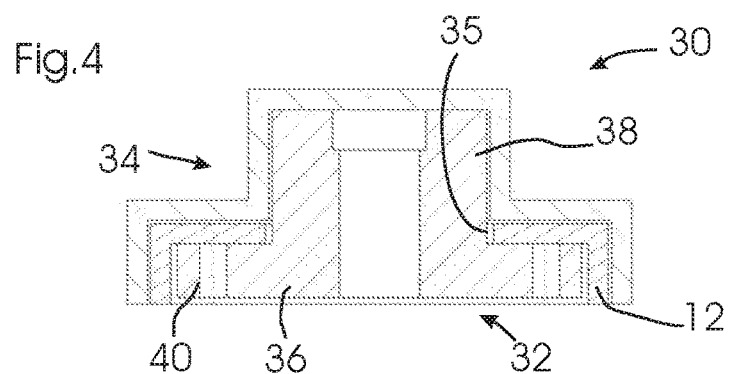
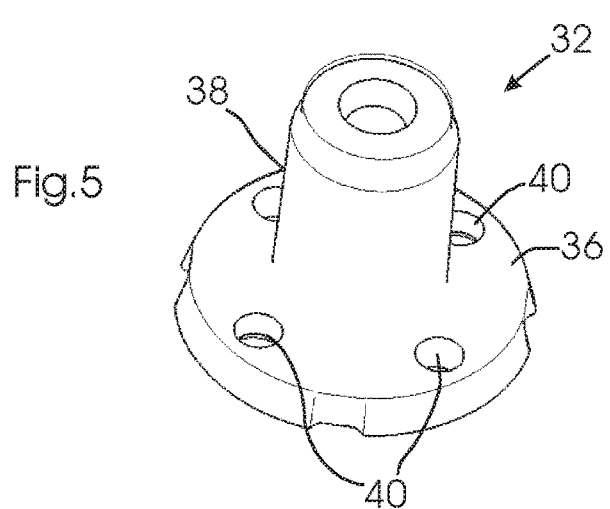

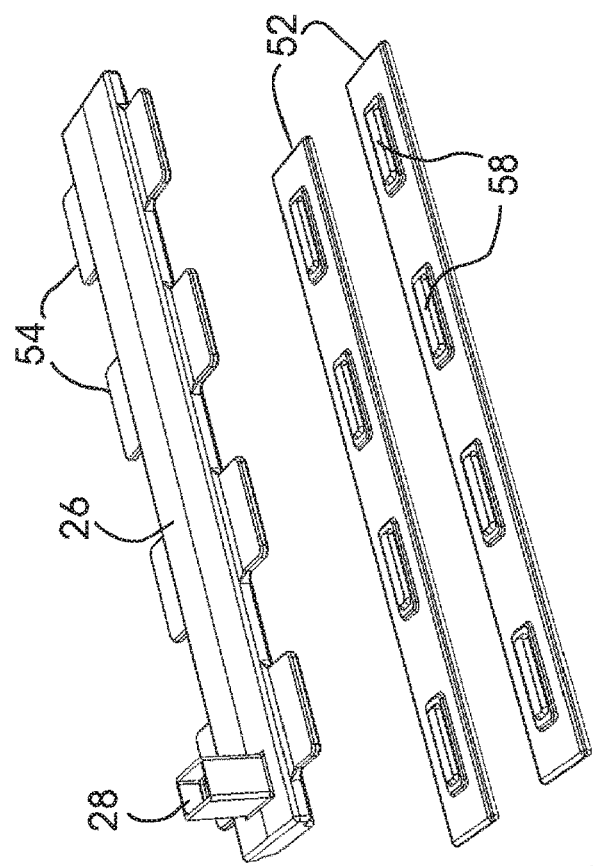
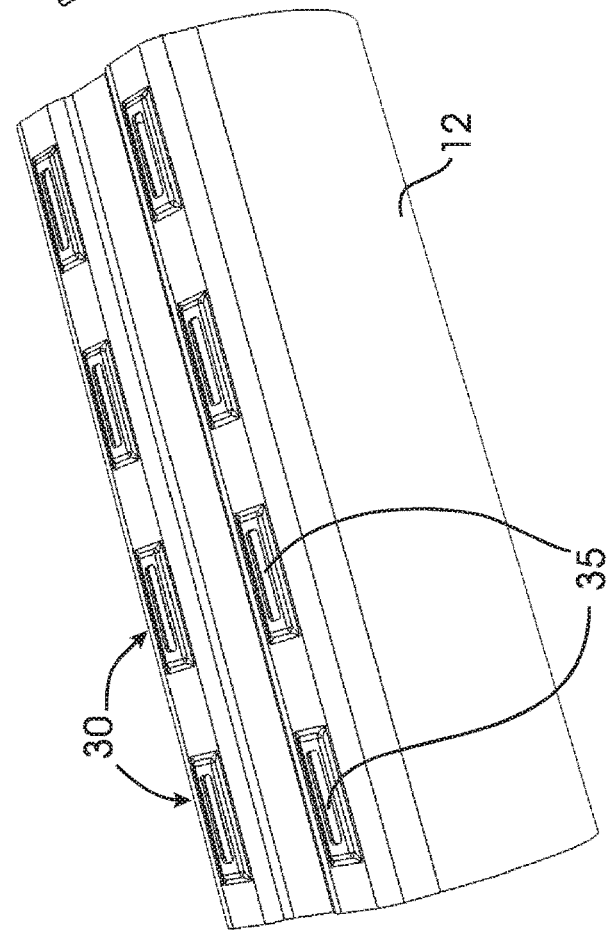
Fig. 9

SHOCK ABSORBER WITH POSITION SENSOR

FIELD

The present disclosure relates to a shock absorber and a method to produce it. In particular, the present disclosure relates to a shock absorber comprising first and second damper parts that are movable relative to each other in a dampened manner, wherein a position sensor is provided to detect the relative position of the damper parts.

BACKGROUND

DE 20 2006 010887 U1 describes, for example, a shock absorber unit having mounting points on a piston rod and a cylinder. A linear relative movement of the mounting points is dampened. A sensor carrier unit is connected to the first mounting point on which a sensor element is arranged. At least one longitudinal guide element is provided on the sensor carrier unit. A cylinder element is connected to the second mounting point, wherein a second sensor element is attached to the cylinder element such that it moves therewith in an axial direction, although it can rotate relative to the cylinder element. The two sensor elements form a sensor for the linear relative movement. The second sensor element has at least one engaging element that interacts with the longitudinal guide element such that when the cylinder element rotates relative to the sensor carrier unit, the radial alignment of the second sensor element relative to the first sensor element is retained.

DE 35 10 252 A1 describes, for example, a position encoder for a hydraulic working cylinder. A Hall sensor as the positioning encoder is arranged on a housing surrounding the piston rod and is mounted on the piston-rod-side end of the cylinder. The piston rod has a conical cross-section that is filled with nonmagnetic material on the piston rod cross-section and serves as a measuring path for the stroke of the working cylinder.

DE 10 2008 004 983 A1 discloses, for example, a sensor holder for a piston/cylinder aggregate. A piston rod that can move relative to a cylinder comprises a holding element that executes a synchronous movement with the piston rod and bears a first position measuring apparatus. A second position measuring apparatus is securely held axially on the cylinder by a holder. The cylinder-side holder and the holding element can rotate relative to each other. A magnetic force acting between the holder and the holding element causes a rotating alignment of the two position measuring apparatuses relative to each other.

DE 10 2004 007 962 A1 describes, for example, a pneumatic spring with a protective sleeve for a rolling bellows. The pneumatic spring comprises a cover that, together with the rolling bellows and a floor part, forms a gas-filled spring chamber. The displacement position of the pneumatic spring is detected by at least one sensor. A seat for a sensor is formed in a pocket in the protective sleeve, wherein the sensor is arranged between the rolling bellows and the protective sleeve.

SUMMARY

Aspects and advantages of embodiments of the present disclosure will be set forth in part in the following description, or may be learned from the description, or may be learned through practice of the embodiments.

Example aspects of the present disclosure provide a shock absorber with a position sensor. One example aspect of the present disclosure is directed to a shock absorber comprising a first and a second damper part. The first damper part is movably arranged in a longitudinal direction (L) relative to the second damper part. A position sensor is arranged to detect the relative position of the first damper part to the second damper part. The position sensor comprises an index element on the first damper part and an electric detection circuit for detecting the position of the index element. A flexible sleeve is at least partially arranged around the first and/or the second damper part which is fixed relative to the second damper part. The detection circuit is attached to the flexible sleeve.

These and other features, aspects and advantages of various embodiments will become better understood with reference to the following description and appended claims. The accompanying drawings, which are incorporated in and constitute a part of this specification, illustrate embodiments of the present disclosure and, together with the description, serve to explain the related principles.

BRIEF DESCRIPTION OF THE DRAWINGS

FIG. 3 shows a plan view of the flexible sleeve and the position sensor of the shock absorber from FIG. 1 and FIG. 2.

FIG. 4 shows a longitudinal section along line A . . . A through an attachment point of the sensor in FIG. 3.

FIG. 5 shows a perspective view of a fastening element of the positions sensor from FIGS. 1, 2, 3, and 4.

FIG. 9 shows an exploded view of the parts of the flexible sleeve and the position sensor from FIG. 8.

DETAILED DESCRIPTION

Figure 1:
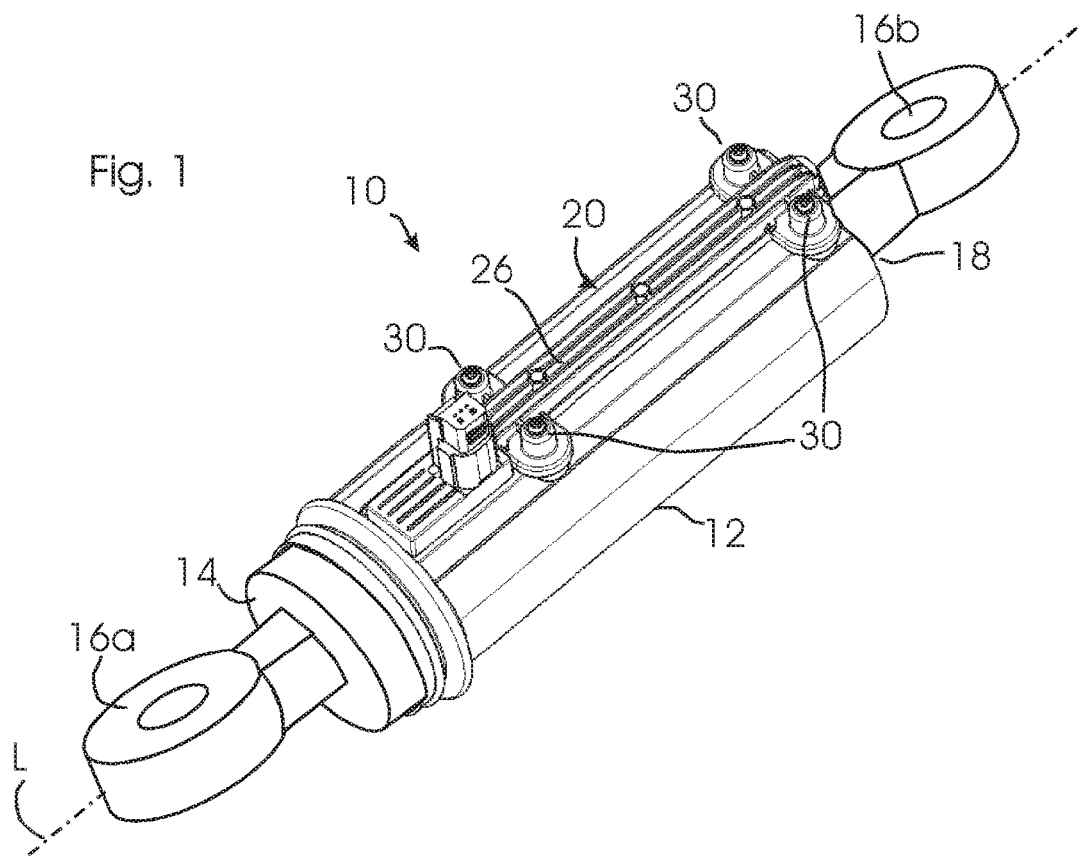
FIG. 1 shows a perspective view of a shock absorber with a flexible sleeve and a position sensor.

Reference now will be made in detail to embodiments, one or more examples of which are illustrated in the drawings. Each example is provided by way of explanation of the embodiments, not limitation of the present disclosure. In fact, it will be apparent to those skilled in the art that various modifications and variations can be made to the embodiments without departing from the scope of the present disclosure. For instance, features illustrated or described as part of one embodiment can be used with another embodiment to yield a still further embodiment. Thus, it is intended that aspects of the present disclosure cover such modifications and variations.

Example aspects of to present disclosure are directed to a design for the arrangement of a position sensor on a shock absorber. More particularly, a shock absorber according to example aspects of the present disclosure and a method to produce a shock absorber according to example aspects of the present disclosure are proposed.

The shock absorber according to example aspects of the present disclosure can be any type of shock absorber in which a first and second damper part are movable relative to each other in a dampened manner in a longitudinally oriented direction of movement. As will be explained in detail below, according to the example embodiments of the present disclosure disclosure, a flexible sleeve is arranged around at least one of the damper parts. According to example embodiments of the present disclosure, a position sensor can be arranged on the shock absorber in that a detection circuit that is part of the position sensor is attached to the flexible sleeve.

"Attaching the detection circuit" is understood to mean that it is affixed directly or indirectly by a circuit carrier on the flexible sleeve so that it is immovable relative thereto both in an axial direction as well as rotationally. Preferably, the detection circuit or a circuit carrier therefore is integrally fastened to the flexible sleeve, for example by welding or gluing and/or in a keyed fit, wherein in some embodiments, a keyed fit with at least one penetration of the flexible sleeve is provided.

In some embodiments, the flexible sleeve bears the detection circuit, i.e., the detection circuit and possibly a circuit carrier therefore are not otherwise fastened to the shock absorber but only to the flexible sleeve.

In some embodiments, the detection circuit and possibly a circuit carrier therefor can be arranged outside of the flexible sleeve so that the flexible sleeve is hence arranged between the first and/or second damper part and the detection circuit. The index element can be arranged within the flexible sleeve so that detection occurs through the sleeve.

Whereas the arrangement, attachment and design of the sensor are hence of consideration, example aspects of the present disclosure are suitable for a wide variety of shock absorber types. This includes shock absorbers on the chassis. The attachment of a position sensor according to the disclosure is suitable for telescopic shock absorbers in which a movement directed in a longitudinal direction of a piston is for example hydraulically dampened in a cylinder.

Since the two damper parts are therefore movable relative to each other in the longitudinal direction, the shock absorber can be compressed to different depths, or respectively extended, i.e., the first and second damper part can assume different relative positions to each other in the longitudinal direction. To detect the current relative position, a position sensor is provided according to the disclosure with an index element and an electric detection circuit. The position of the index element relative to the detection circuit is detectable, for example by a suitable activation or respectively signal evaluation in the detection circuit.

The index element can be attached to the first damper part (which is also understood to be an arrangement on a part securely connected thereto) and accordingly always moves with it. The detection circuit is attached to a flexible sleeve that is fixedly arranged relative to the second damper part. Accordingly, the relative position of the first and second damper part is detectable from the relative position of the index element and detection circuit.

The flexible sleeve is at least partially arranged around one or both of the damper parts. The sleeve preferably consists of a flexible material such as rubber, elastomer, etc. In some embodiments, it is a closed sheath that encloses and surrounds the first and/or second damper part over a certain length. For example, this length can correspond to at least half of the respective overall length.

The flexible sleeve is suitable for surrounding the first and/or second sensor part dust-tight, as well as in particular the region of the seat of a piston in a cylinder of the shock absorber in a transverse direction (i.e., transverse to the direction of movement of the damper parts relative to each other in the longitudinal direction). Such flexible sleeves are also known as a "dust boot".

The attachment of a sensor part, i.e., the detection circuit in this case, to the flexible sleeve has proven to be a particularly easy measure because the sensor thus does not have to be attached to the functional elements, i.e., elements of the shock absorber participating in the actual damping. It was revealed that despite the attachment to a flexible part, sufficiently effective fixation of the detection circuit is possible, and the relative arrangement to the second damper part as well as to the index element is adequate for a sufficiently precise detection of the relative position of the damper parts.

According to some embodiments, the detection circuit extends in the longitudinal direction over a detection region. The detection circuit can preferably be attached on or in a circuit carrier. In particular, this can comprise a printed circuit board and/or a housing for the detection circuit. Preferably, the circuit carrier is a rigid component, for example consisting of a rigid plastic material.

In some embodiments, the circuit carrier can be connected to the flexible sleeve at at least two attachment points. For positionally correct fixation, attachment to at least two attachment points at a distance from each other in the longitudinal direction can be effective, in one example to two attachment points that are spaced from each other by more than 50% of the length of the detection region. It is likewise feasible to provide a first and second attachment point at a distance from each other in a transverse direction so that the detection circuit is arranged between the first and second attachment point. Attachments with more than two attachment points that are at a distance from each other both in the longitudinal as well as in the transverse direction are particularly preferable.

Various types of fastening can be used to attach the circuit carrier to the flexible sleeve. According to one embodiment, the attachment to at least one of the attachment points can comprise a fastening element. The fastening element can be arranged so that it penetrates the flexible sleeve. For example, a fastening element can be used that comprises at least one head region and a shaft region, wherein the head region is wider than the shaft region. The shaft region can penetrate the flexible sleeve and be fastened to the circuit carrier. The flexible sleeve can be arranged between the wider head region and the circuit carrier, in particular clamped there. A secure attachment can thus be achieved despite the flexible properties of the sleeve.

When a fastening element with a shaft region penetrating the flexible sleeve and a wider head region are used, the inside of the head region facing the sleeve can have at least one elevation and/or recess to improve anchoring. For example, when the flexible sleeve is clamped between the head region and the circuit carrier, a keyed seat and hence an improved attachment results from at least one (preferably several) of such elevations or respectively recesses.

The fastening element can for example be designed as a rivet. The attachment to the circuit carrier can be accomplished in various ways, for example by gluing, welding, latching, etc. In some embodiments, the shaft region can be fastened to the circuit carrier in a keyed or integral manner by deforming and/or joining.

A particularly suitable form of deforming, or respectively joining can be constituted by heating with a laser. To accomplish this, at least one seating region formed in the circuit carrier in which the shaft region is accommodated can be designed to be at least partially transparent to laser light of at least one wavelength. During attachment, the fastening element and particularly preferably its shaft region can be heated by laser in order to form a secure connection with the seating region by deforming or welding. In some embodiments, the shaft region can be fastened to the seating region by laser transmission welding.

In some embodiments, a fastening element can also be fastened to the circuit carrier using other connecting techniques, for example by a screwed connection. In this case as well, a fastening element can be provided with a head region and a shaft region that penetrates the flexible sleeve and can be fastened to the circuit carrier by a screw.

According to an embodiment, the connection can be effected between the circuit carrier and flexible sleeve, for example at two attachment points arranged at a distance from each other, by fastening elements that preferably penetrate the flexible sleeve, i.e., are inserted for example through openings provided there. In this case, at least two fastening elements can be connected to each other, for example by a strip, at attachment points at a distance from each other. The strip can be arranged on the side of the flexible sleeve opposite the circuit carrier, preferably the inside of the flexible sleeve. For example, a plurality of fastening elements can be fastened to the strip, especially preferably also formed integrally therewith. In some embodiments, the two parallel strips can each be provided with a plurality of fastening elements on the inside of the flexible sleeve.

The position sensor can be designed in various ways in order to enable the position of the index element relative to the electric detection circuit to be detected. The employed measuring or detection principle can for example be an optical, magnetic, inductive or capacitive principle. Accordingly, the index element for example can be designed as a ferromagnetic index element, permanent magnetic index element, inductive index element or an electrical circuit as well as an electrical oscillating circuit. To detect the position of the index element, the detection circuit can comprise a coil arrangement which extends in the longitudinal direction over a detection region. The coil arrangement can, for example, comprise at least one excitation coil with which a signal, for example an electric and/or magnetic field, or respectively an electromagnetic wave is generated. The coil arrangement can comprise at least one detection coil with which a signal, for example an electric and/or magnetic signal, or respectively an electromagnetic wave can be detected. In a design, the coil arrangement is connected to an evaluation circuit with which the position of the index element within the detection region can be determined by the detection of signals in the detection coil. A preferred example of an inductive position sensor with a coil arrangement and an evaluation circuit with which the position of an index element can be detected is described in WO 03/038379 A1.

The flexible sleeve on the shock absorber can be designed differently. In some embodiments, it is a body in the shape of a cylinder jacket, at least sectionally. The flexible sleeve, in some embodiments, has a thin wall thickness of for example 0.5 to 4 mm. In some embodiments, the flexible sleeve has a thin wall thickness of 1 to 3 mm. The flexible sleeve may be entirely closed in the transverse direction. In the longitudinal direction, the flexible sleeve can also be sealingly attached to the damper parts, for example with a bellows.

Further details and advantages of the present disclosure are explained with reference to the following description of the figures.

FIG. 1, 2 shows a perspective representation and a side view of an example of a first embodiment of a shock absorber 10 with a flexible sleeve 12.

A feature of the disclosure is the attachment of parts of a position sensor 20 to the flexible sleeve 12 of the shock absorber 10. Design details of the other functional parts of the shock absorber 10 are therefore only to be understood as one representation and may deviate in other designs. The shock absorber 10 portrayed as an example comprises a cylindrical part 14 with a first mounting element 16*a* as well as a piston part 18 that moves linearly in a longitudinal direction L relative to the cylindrical part 14 and has a second mounting element 16*b* securely arranged thereon.

Figure 2:
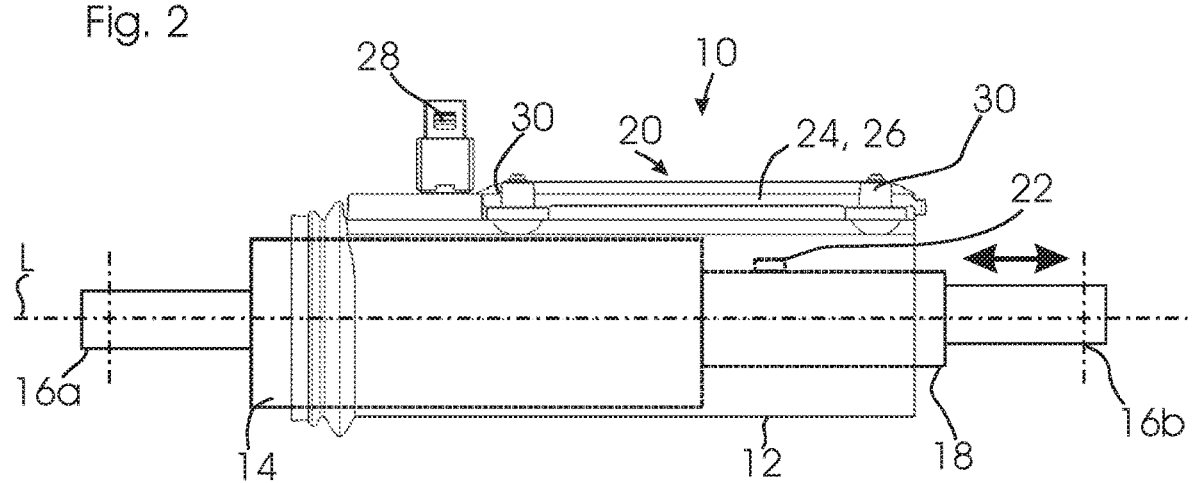
FIG. 2 shows the shock absorber from FIG. 1 in a side view.

In a manner known per se, the damper parts 14, 18 can be moved guidably relative to each other in a longitudinal direction L, wherein this movement is dampened by a hydraulic device in the cylinder part 14. As indicated in FIG. 2 by a double arrow, the piston part 18 can accordingly be inserted to different depths in the cylindrical part 14 so that the spacing of the mounting elements 16*a*, 16*b* is linearly variable. The mounting elements 16*a*, 16*b* are provided for mounting on parts that move relative to each other, for example of a chassis of a vehicle. A relative movement of the parts in the longitudinal direction L and hence also of the mounting elements 16*a*, 16*b* as well relative to each other is dampened. The relative position of the cylinder part 14 and piston part 18 that is assumed in each case is detected by the position sensor 20.

As shown in the drawings, the flexible sleeve 12 is arranged on the shock absorber 10 so that it surrounds the piston and the cylinder part 14, 18 and seals in a transverse direction (i.e., transverse to the longitudinal direction L). The flexible sleeve in the portrayed example is a cylindrical element with a thin wall consisting of flexible material. For example, the material can be rubber, natural rubber, or an elastomer such as TPE or TPV. The wall thickness can for example be 1.5 mm. The flexible sleeve 12 is dust-tight, and accordingly protects parts of the shock absorber 10 and in particular the site of entry of the piston element 18 into the cylinder element 14 from soiling. At its first end facing the mounting element 16*a* of the cylinder part 14, the sleeve 12 is attached to the cylinder part 14 for example by a keyed fit, clamping, etc.

The sleeve 12 is flexible in this case so that it can deform under external effects.

The position sensor 20 comprises an index element 22 attached to the piston part 18 (FIG. 2), and a detection circuit 24 that is arranged within a rigid circuit carrier 26. The detection circuit 24 extends in a longitudinal direction L over a measuring range within which the relative arrangement of the index element 22 to the detection circuit 24 is detectable. To realize such a sensor, various techniques and detection principles are known, for example magnetic, inductive, capacitive or optical detection techniques. The portrayed preferred embodiment is an inductive position sensor 20 in which the detection circuit 24 has different coils extending over the detection region, including at least one excitation and one detection coil. The index element 22 can be excited inductively, for example it is an electrically conductive element or preferably an oscillating circuit. Depending on the relative position of the index element 22 to the detection circuit 24, there is a variable cross-coupling between the excitation and detection coil so that the relative position of the index element 22 is discernible by evaluating signals from the detection coil. Coil design and signal processing for such inductive sensors are known per se, for example from WO03/038379A1.

The sensor 20 comprises a plug-in connection 28 at the circuit carrier 26 where electric signals are transmitted to the detection circuit 24 and therefrom. Suitable evaluation electronics can therefore either be integrated in the circuit carrier 26 and report current position data of the index element 22 via the plug-in connection 28, or the evaluation electronics can be arranged remotely and transmit excitation signals to the detection circuit 24 via the plug-in connection 28 and receive detection signals therefrom.

The rigid circuit carrier 26 is attached to the outside of the flexible sleeve 12. In this case, it is connected at attachment points 30 to the flexible sleeve 12 and thus fastened thereto.

In the shown embodiment, a total of four attachment points 30 are provided, for example. On the one hand, these are spaced from each other in pairs in a transverse direction so that the circuit carrier 26 is always arranged between the attachment points. On the other hand, two pairs of attachment points 30 are spaced from each other in the longitudinal direction L.

As shown in greater detail in particular in FIG. 3-5, the circuit carrier 26 is fastened to the sleeve 12 at the attachment points 30 by means of fastening elements 32 that extend through openings 35 in the wall of the sleeve 12.

In an enlarged representation, FIG. 5 shows a perspective view of a rivet element provided as a fastening element 32 according to the first embodiment with a flat head 36 and a shaft 38 that has a smaller diameter than the head 36 and extends therefrom at a right angle.

As can be seen from the sectional view in FIG. 4, the shaft 38 penetrates the opening 35 in the wall of the sleeve 12. A seat 34 is formed on the circuit carrier 26 in which the shaft 38 of the fastening rivet 32 is accommodated. In this case, the wall of the sleeve 12 is clamped between the head 36 and the seat 34.

To achieve a more effective grip of the flexible wall material between the head 36 and the seat 34, holes 40 are provided in the inside of the head 36 in the shown embodiment. If the flexible wall is clamped between the head 36 and seat 34, the flexible material deforms and stretches slightly into the region of the holes 40 so that a keyed grip results. Instead of the holes 40, elevations can also be provided in alternative embodiments which also yields a keyed connection upon clamping.

The end of the shaft 38 is fastened in the seat 34. Various types of fastening are possible for this. For example, the fastening rivet 32 can be glued in the seat 34. In some embodiments, the seat 34 is made of a material transparent to laser light of an employed welding laser. By means of the welding laser, the axial end of the shaft 38 is heated through the seat 34 and melted so that the rivet 32 is welded to the seat.

Figure 6:
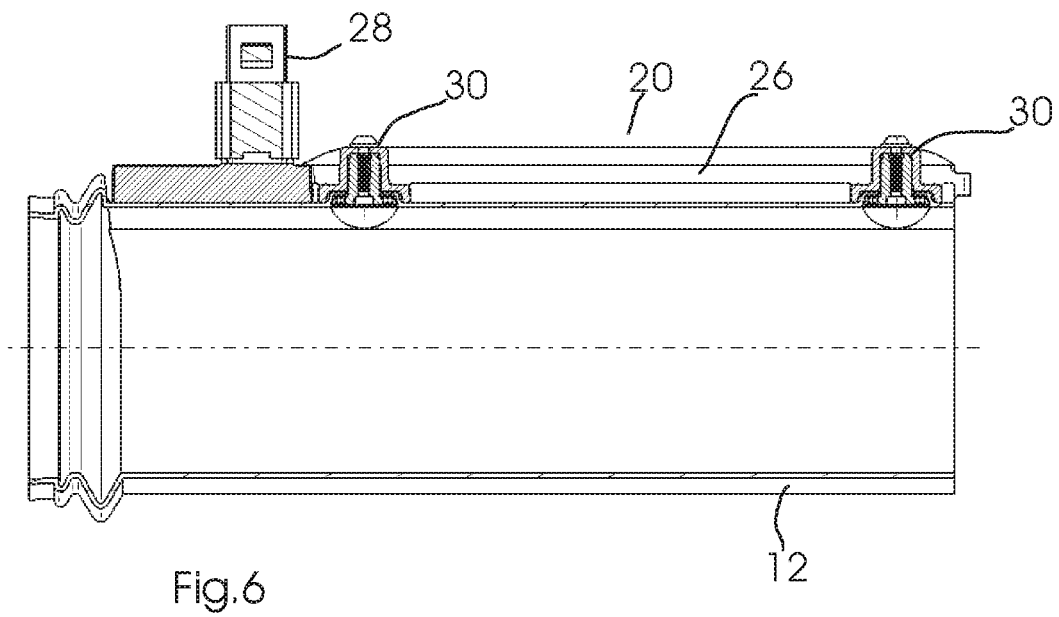
FIG. 6 shows a longitudinal section of a second embodiment of a flexible sleeve with the position sensor attached thereto.
Figure 7:
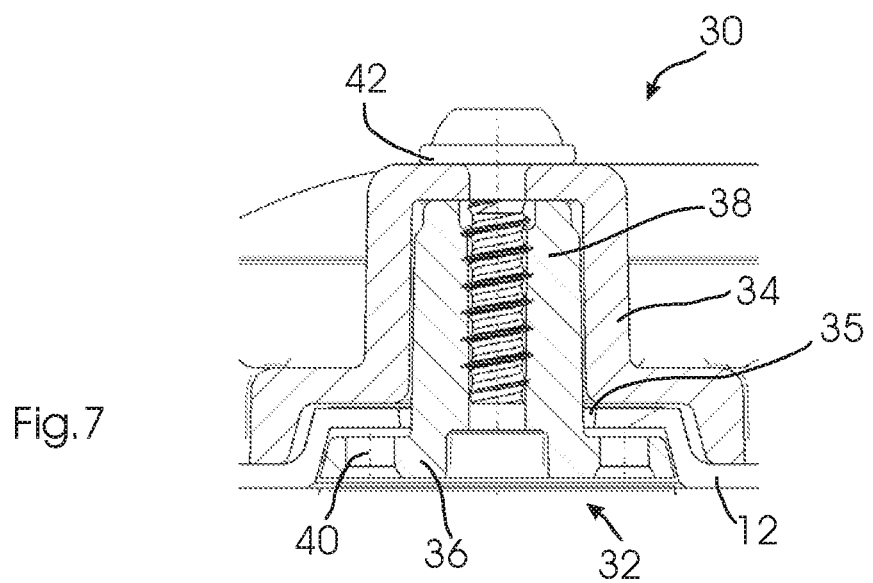
FIG. 7 shows a longitudinal section and an enlarged representation of an attachment point of the sensor from FIG. 6.
Figure 8:
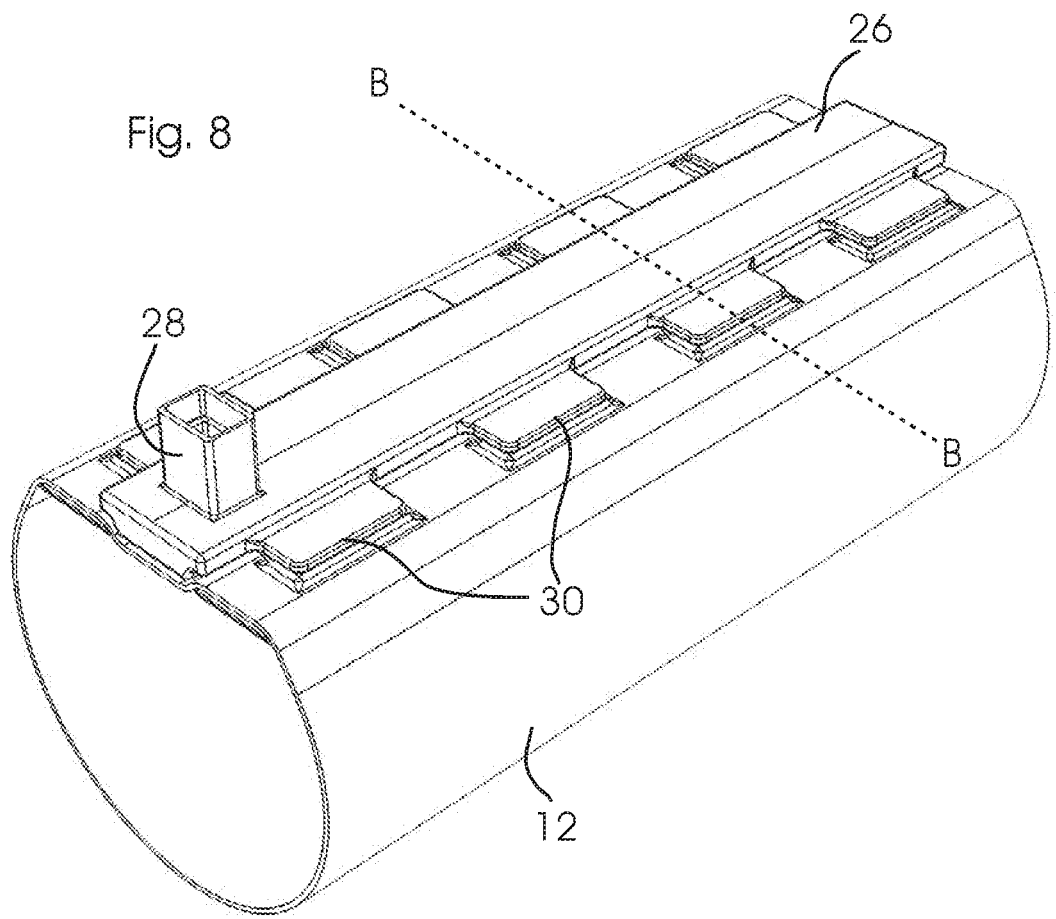
FIG. 8 shows a perspective view of a third embodiment of a flexible sleeve with a position sensor.

In FIG. 6, FIG. 7, the flexible sleeve 12 and the circuit carrier 26 fastened thereto of the sensor 20 are shown according to a second embodiment. The second embodiment largely corresponds to the first embodiment; the same elements are identified by the same reference numbers. A difference only exists in terms of the attachment points 30 of which one is portrayed enlarged in a longitudinal section in FIG. 7. In the following, only the differences between the embodiments will be described further.

In the second embodiment, a fastening element 32 is also used to fix the circuit carrier 26 to the flexible sleeve 12. The fastening element 32 can have the same shape as the first embodiment, and accordingly has a shaft 38 that penetrates an opening 35 in the wall of the flexible sleeve 12. The wall is clamped between the head 36 and the seat 34 to sides of the circuit carrier 26.

In contrast to the welding or gluing technique used in the first embodiment, the fastening element 32 is fixed by sides of the circuit carrier 26 and its seat 34 with a screw 42 in the second embodiment. The fastening element 32 has a central hole for this into which the screw 42 engages.

A third embodiment is shown in FIG. 8-11. Many elements of this embodiment also correspond with the above-shown and described embodiments; the same elements are identified by the same reference signs. In the following, reference will only be made to the differences.

The third embodiment differs from the previously explained embodiments in terms of the type of attachment of the circuit carrier 26 to the flexible sleeve 12. For this, a total of four pairs of attachment points 30 are arranged on each of the two sides of the circuit carrier 26 in the portrayed example, wherein the pairs are each spaced from each other in the longitudinal direction L. Overall, the circuit carrier 26 is therefore connected at eight attachment points to the flexible sleeve 12.

As can be seen from the exploded view in FIG. 9, elongated openings 35 are arranged in the wall of the flexible sleeve 12 at each of the attachment points 30. Two strips 52 having four elevations 58 each and spaced from each other in a longitudinal direction L are arranged on the inside of the sleeve 12. Seating tabs 54 are formed on both sides of the circuit carrier 26.

Figure 10:
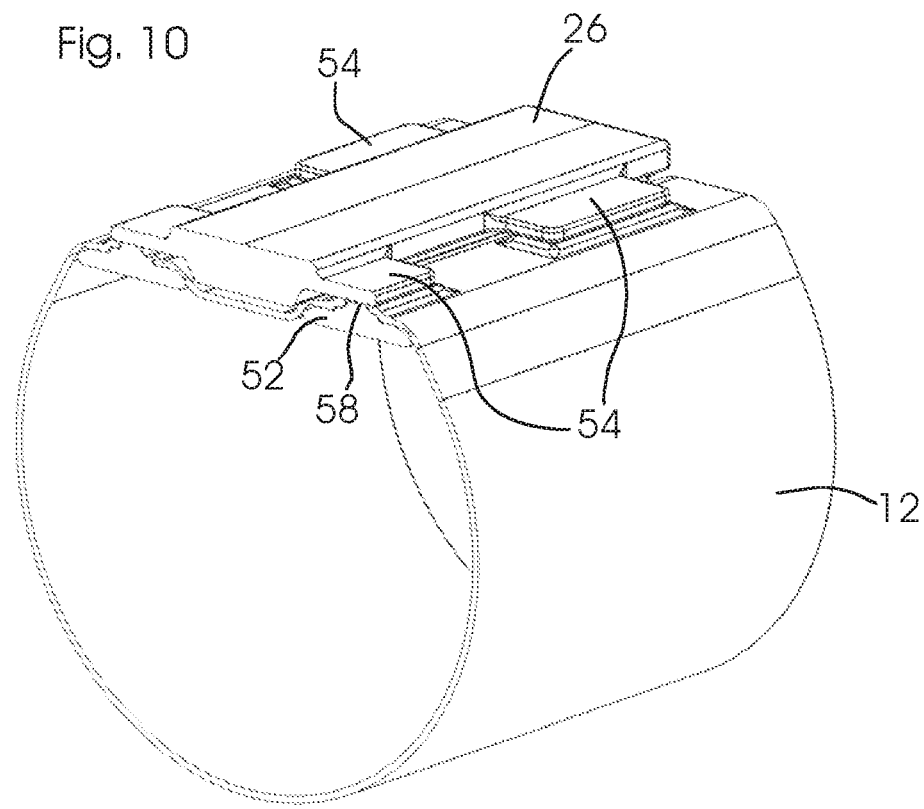
FIG. 10 shows a perspective view of a section along line B . . . B in FIG. 8 through the flexible sleeve and the position sensor.
Figure 11:
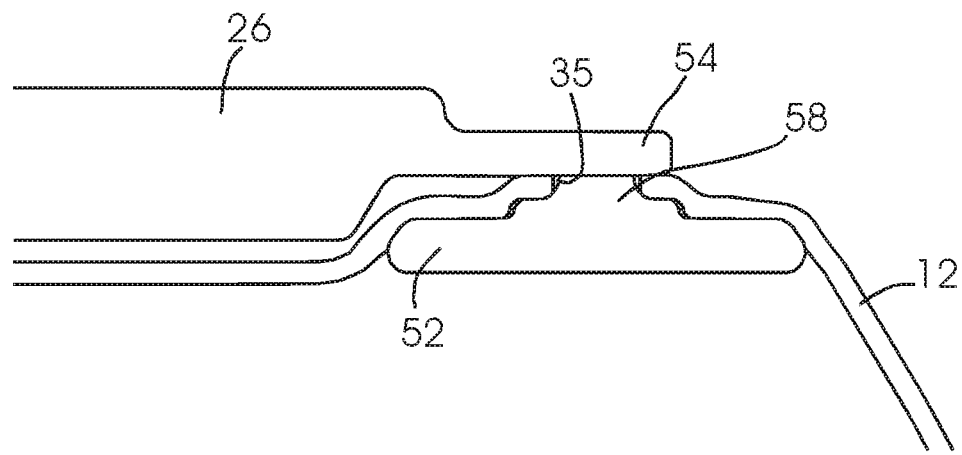
FIG. 11 shows an enlarged representation of a part of the sectional view through an attachment point in FIG. 10.

As can be seen in the representations in FIG. 10, FIG. 11, the elevations 58 on the strips 52 each penetrate the openings 35 in the wall of the flexible sleeve 12 and are thus in contact with the seating tabs 54 of the circuit carrier 26. The elevations 58 are securely connected to the bottom sides of the seating tabs 54, for example by gluing, welding or other connecting techniques. The wall 12 in this case is clamped between the strips 52 and the seating tabs 54 to achieve effective fixation of the circuit carrier 26 to the flexible sleeve 12.

The shown embodiments of shock absorbers, sleeves, sensors and connecting techniques, with an easy attachment of the sensor 20, allow the relative position of the damper parts 14, 18 to be effectively detected. Given the secure attachment of the sleeve 12 to one of the sensor parts, i.e., the cylinder part 14, and given the fixation of the index element 22 on the other sensor part, i.e., the piston part 18, a sensor signal can be supplied at the connection 28 which indicates how deeply the piston part 18 is inserted in the cylinder part 14. In this case, the piston and cylinder 14, 18 are surrounded by the flexible sleeve and for example protected against soiling. The flexible sleeve 12 can deform under external effects, for example under strong movements by a chassis. Nonetheless, the connection is sufficient to ensure effective detection due to the attachment of the circuit carrier 26 on the attachment points 30.

In this case, the embodiments that are shown and described above are only to be understood as examples and nonrestrictively. This relates in particular to the design of the shock absorber. Moreover, the features of the individual embodiments can also be combined with each other differently than is shown in the embodiments, for example by attaching screws at the attachment points 30 of the third embodiment, by connecting fastening elements 32 of the first or second embodiment by means of strips, or by placing recesses or elevations on the inside of the strips 52 in the third embodiment corresponding to the holes 40 in the first and second embodiment.

While the present subject matter has been described in detail with respect to specific example embodiments thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

The invention claimed is:

1. A shock absorber comprising:
a first and a second damper part, wherein the first damper part is movably arranged in a longitudinal direction (L) relative to the second damper part,
wherein a position sensor is arranged to detect the relative position of the first damper part to the second damper part, wherein the position sensor comprises an index element on the first damper part and an electric detection circuit for detecting the position of the index element, wherein a flexible sleeve is at least partially arranged around the first and/or the second damper part which is fixed relative to the second damper part, and wherein the detection circuit is attached to the flexible sleeve;
wherein the detection circuit extends over a detection region in the longitudinal direction (L), and the detection circuit is attached to a circuit carrier, wherein the circuit carrier is connected to the flexible sleeve at at least two attachment points spaced from each other in the longitudinal direction (L); and
wherein the circuit carrier is fastened at at least one first and one second attachment point to the flexible sleeve, wherein the detection circuit is arranged between the first and the second attachment point.

2. The shock absorber according to claim 1, wherein:
the circuit carrier is fastened at at least one of the attachment points to the flexible sleeve by means of a fastening element with a head region and a shaft region,
wherein the shaft region penetrates the flexible sleeve and is fastened to the circuit carrier,
wherein the head region is wider than the shaft region, and the flexible sleeve is arranged between the head region and the circuit carrier.

3. The shock absorber according to claim 2, wherein:
the fastening element is a rivet; and
the shaft region is fastened to the circuit carrier in a keyed or integral manner by deformation and/or joining.

4. The shock absorber according to claim 3, wherein:
a seating region for the shaft region is formed on the circuit carrier,
wherein at least the seating region is formed from a material that is at least partially transparent to laser light of at least one wavelength.

5. The shock absorber according to claim 2, wherein:
the head region on the inside facing the sleeve has at least one elevation and/or recess.

6. The shock absorber according to claim 2, wherein:
the shaft region is fastened to a seating region on the circuit carrier by laser transmission welding.

7. The shock absorber according to claim 2, wherein:
the fastening element is fastened to the circuit carrier by a screwed connection.

8. The shock absorber according to claim 1, wherein:
fastening elements of at least two attachment points are connected to each other.

9. The shock absorber according to claim 8, wherein:
a plurality of fastening elements is integrally formed on a strip.

10. The shock absorber according to claim 1, wherein:
the index element is a ferromagnetic index element, an inductive index element, a permanent magnet index element or an electric circuit,
and the detection circuit comprises a coil arrangement with a least one detection coil that extends in the longitudinal direction (L) over a detection region,
wherein an evaluation circuit is connected to the coil arrangement with which the position of the index element within the detection region can be determined by the detection of signals in the detection coil.

11. The shock absorber according to claim 1, wherein:
the flexible sleeve sealingly encloses the first and/or second damper part, at least over half of the respective length.

12. The shock absorber according to claim 1, wherein:
the flexible sleeve consists of rubber or another flexible material with a wall thickness of 0.5-4 mm.

13. A method to produce a shock absorber with a position sensor, wherein
a flexible sleeve is arranged so that it at least partially surrounds a first and a second damper part whose relative movement is dampened in a longitudinal direction (L), and is fixedly arranged relative to the second damper part,
and an index element is attached to the first damper part, and an electric detection circuit for detecting the position of the index element is attached to the flexible sleeve wherein the electric detection circuit extends over a detection region in the longitudinal direction (L), and the detection circuit is attached to a circuit carrier, wherein the circuit carrier is connected to the flexible sleeve at at least two attachment points spaced from each other in the longitudinal direction (L)
wherein the circuit carrier is fastened at at least one first and one second attachment point to the flexible sleeve, wherein the detection circuit is arranged between the first and the second attachment point.

* * * * *